United States Patent [19]

Kulwicki

[11] 4,107,515
[45] Aug. 15, 1978

[54] COMPACT PTC RESISTOR

[75] Inventor: Bernard Michael Kulwicki, Foxboro, Mass.

[73] Assignee: Texas Instruments Incorporated, Dallas, Tex.

[21] Appl. No.: 721,727

[22] Filed: Sep. 9, 1976

[51] Int. Cl.² .............................................. H05B 3/08
[52] U.S. Cl. ................................... 219/541; 219/381; 219/543; 219/553; 338/22 R
[58] Field of Search ............... 219/222, 345, 381, 530, 219/540, 541, 548, 543, 552, 553; 338/22 R, 22 SD, 323, 327; 252/296

[56] References Cited

U.S. PATENT DOCUMENTS

| | | | |
|---|---|---|---|
| 3,163,841 | 12/1964 | Willett | 219/345 X |
| 3,295,089 | 12/1966 | Moore | 338/22 R X |
| 3,617,695 | 11/1971 | Meyer et al. | 219/222 |
| 3,632,971 | 1/1972 | Flanagan | 219/222 |
| 3,885,129 | 5/1975 | Fabricius | 219/553 |
| 3,927,300 | 12/1975 | Wada et al. | 219/381 |
| 3,956,614 | 5/1976 | Hervert | 219/541 |
| 3,995,143 | 11/1976 | Hervert | 219/553 |
| 4,032,752 | 6/1977 | Ohmura et al. | 219/541 |
| 4,034,207 | 7/1977 | Tamada et al. | 219/553 X |

FOREIGN PATENT DOCUMENTS

| | | | |
|---|---|---|---|
| 1,056,510 | 1/1967 | United Kingdom | 338/22 R |
| 1,337,929 | 11/1973 | United Kingdom | 338/22 R |

Primary Examiner—Volodymyr Y. Mayewsky
Attorney, Agent, or Firm—John A. Haug; James P. McAndrews

[57] ABSTRACT

A compact resistor device comprises a body of ceramic material of positive temperature coefficient of resistivity having a large number of passages extending through the body between opposite ends of the body, thereby forming very thin webs of the resistor material between adjacent passages. Coatings are formed on the resistor material along the inner walls of the passages to serve as ohmic contacts. The coatings in alternate passages are connected together at one end of the resistor device and the coatings in the other passages are connected together at the opposite end of the device to serve as device terminals. When the device terminals are connected to a power source, current flows through very thin webs of resistor material between ohmic contacts in adjacent body passages. The resistor device is particularly useful in current limiting applications requiring low, room-temperature resistance and in heat-exchanger applications where a fluid to be heated is directed through the passages.

9 Claims, 7 Drawing Figures

COMPACT PTC RESISTOR

Resistors formed of ceramic materials of positive temperature coefficient of resistivity (PTC) are used in many applications as current limiting devices and as self-regulating heaters. When electrical current is directed through such materials, the materials tend to heat and to display increasing resistivity so that current flow in the resistor is reduced and so that the rate of heat generation by the resistor is decreased. When the rate of heat generation reaches equilibrium with the rate of heat dissipation from the resistor, the resistor temperature stabilizes and limits the resistor current to a selected level. The initial, room temperature resistivity of a PTC material and the rate of change of resistivity with temperature are characteristic of the material and the materials used in such resistors are commonly chosen to display a sharp, anomalous increase in resistivity at a particular temperature, thereby to stabilize heating of the resistor at about that temperature while also reducing resistor current to a very low level at the stabilizing temperature.

For some current limiting resistor applications, it would be desirable to provide a bistable current limiting resistor which could carry a substantial current load under normal conditions without self-heating to any significant extend but which would be rapidly self-heated to significantly limit resistor current if an overcurrent condition should occur. Such a bistable current limiting device could be arranged in series with an electric motor to carry normal motor operating currents with only moderate variations of resistor temperature but could be rapidly self-heated in response to overcurrent conditions in the motor if the motor were overloaded, thereby to restrict motor current to a safe level before overheating of the motor winding could occur. However, it has been difficult to obtain resistor materials having desired positive temperature coefficients of resistivity which also display the low room-temperature resistivities necessary to permit a compact, rugged resistor to carry normal motor currents without immediately heating the resistor materials to their high resistivity temperatures.

For some uses of PTC resistors as self-regulating heaters, it has also been suggested that the resistor body be provided with a large number of passages extending between opposite ends of the body. When ohmic contacts are then formed at each end of the body, and when electrical current is directed through the body while fluid flows through the body passages, the fluid is efficiently heated without risk of resistor overheating even if the fluid flow should be blocked or interrupted. However, such fluid heating resistors have been subject to undersirable resistance banding. That is, thermal gradients occurring in the resistor material between opposite ends of the resistor as fluid is passed through the resistor passages permit narrow bands of high resistivity material to be established across the direction of current flow. As a result, current is reduced resulting in reduced heater efficiency and, in addition, such narrow bands of the resistor material may be subjected to local electrical fields which are excessively high and which tend to degrade the PTC materials.

It is an object of this invention to provide a novel and improved resistor device of a material of positive temperature coefficient of resistivity; to provide such a resistor device which is particularly adapted for use as a self-regulating fluid heater; to provide such a resistor device which is particularly adapted fo use as a current limiting device having very low room-temperature resistance; and to provide such a resistor device which is of rugged, compact, reliable and inexpensive structure.

Briefly described, the novel and improved resistor device of this invention comprises a resistor body preferably formed of a ceramic material of positive temperature coefficient of resistivity. The body is provided with a large number of small, closely spaced passages which extend in side-by-side relation to each other between two opposite end surfaces of the resistor body. Ohmic contacts are formed on the resistor material extending along the inner walls of the body passages, typically by coating the inner walls of the passages with a very thin, highly adherent metal coating. The ohmic contact layers in alternate ones of the body passages are then connected together at one of the end surfaces of the resistor device while the ohmic contact layers in the other body passages are connected together at the opposite end surface of the device. In this way, each group of commonly connected contact layers serves as one terminal of the resistor device. Accordingly, when electrical current is directed between the device terminals, the current flow is between the ohmic contact layers in pairs of adjacent body passages so that the current passes through only the very thin webs of the resistor material which separate the adjacent body passages from each other.

In this arrangement, the thickness of the resistor material between the ohmic contact coatings is very small so that the resistor device displays very low room-temperature resistance even though ceramic materials having conventional room-temperature resistivities are used in the device. On the other hand, because the resistor body passages are small and closely spaced, the resistor device accomodates very large effective ohmic contact areas even though the resistor device is of a compact, rugged structure, Accordingly, the resistor device is adapted to carry a relatively large current load while maintaining a low current density in the thin web portions of the resistor body. With this structure, the resistor device of this invention is adapted to be connected in series with an electrical motor to carry normal motor currents without self-heating the resistor material to its high resistivity state but to rapidly heat the material to its high resistivity state to limit motor current to a safe level if the motor should be overloaded.

The described resistor structure also has advantages when used as a self-regulating heater. For example, if a fluid to be heated is directed through the passages of the resistor device of this invention, thermal gradients occurring in the body do not tend to subject the resistor materials to excessive electrical fields at any locations within the resistor body. That is, although the resistor body may tend to be more rapidly heated near one end of the device as fluid flows in the device passages, the higher resistivity occurring at that location does not restrict flow of electrical current between ohmic contact areas at other locations within the resistor body. Thus, heating efficiency is not excessively reduced. Further, because the webs of resistor material between the ohmic contact coatings in adjacent body passages are very thin, thermal gradients which may occur across the thickness of the thin webs are not significant.

Other objects, advantages and details of the novel and improved resistor device of this invention, of methods for making the resistor device, and of systems using the resistor device appear in the following detailed description of preferred embodiments of the invention, the detailed description referring to the drawings in which.

Figure 1:
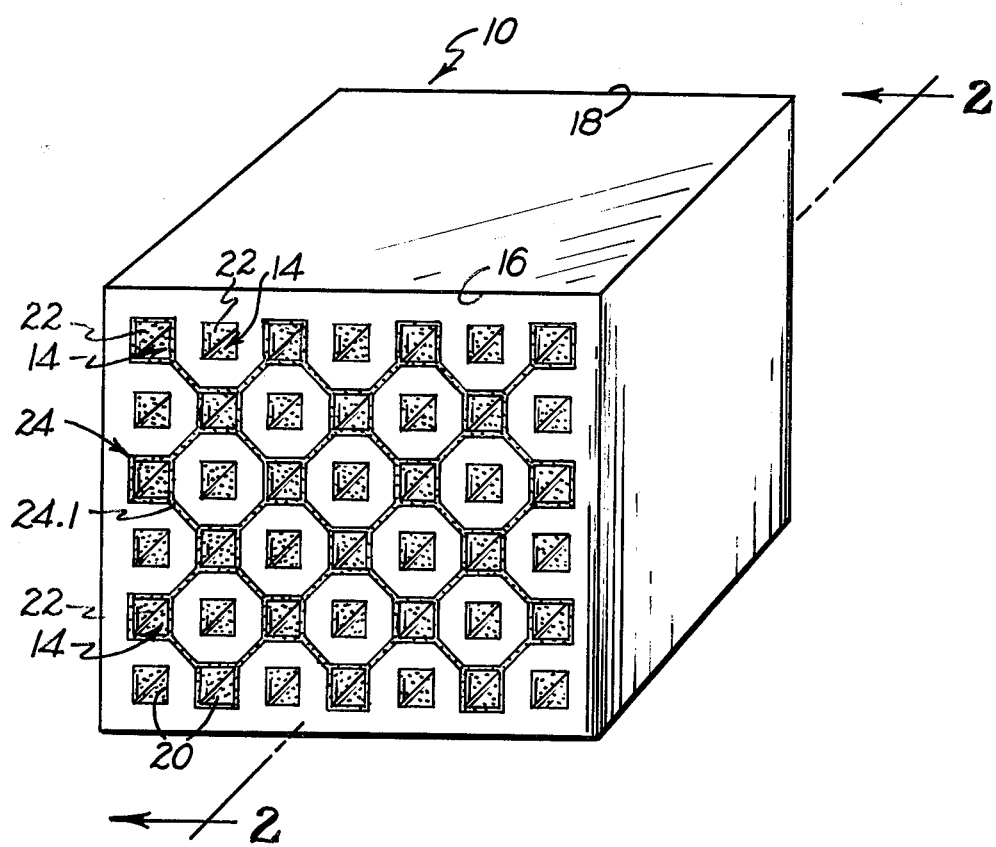
FIG. 1 is a perspective view of the novel and improved resistor device of this invention.
Figure 2:
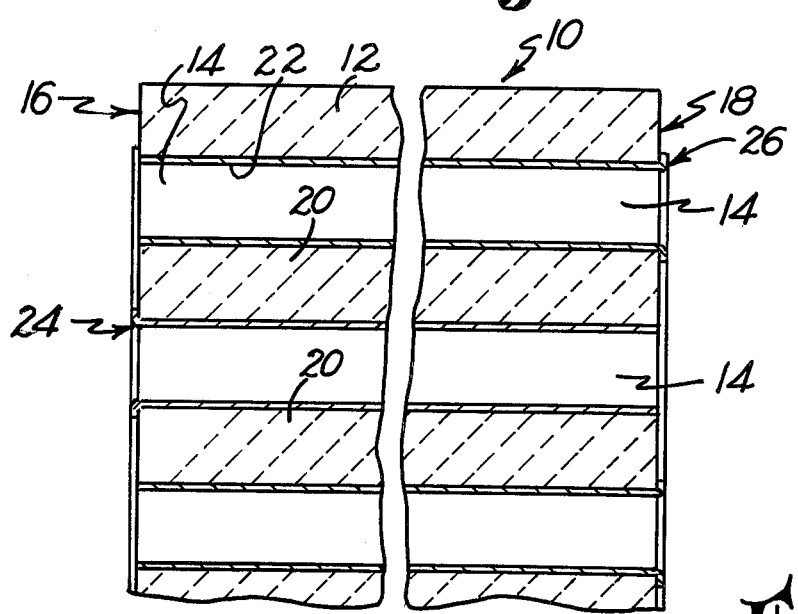
FIG. 2 is a partial section view to enlarged scale along line 2—2 of FIG. 1.

Referring to the drawings, 10 in FIGS. 1 and 2 indicates the novel and improved resistor device of this invention which is shown to include a resistor body 12 formed of a material having a positive temperature coefficient of resistivity. Preferably the resistor body is formed of a conventional ceramic resistor material such as lanthanum-doped barium titanate or the like and preferably the resistor material is selected to display a sharp, anomalous increase in resistivity when the resistor body is heated to a particular temperature.

The resistor body 12 has a plurality of passages 14 extending in a pattern in side-by-side relation to each other between two opposite end surfaces 16 and 18 of the resistor body. For example, the passages are arranged in a pattern with at least three rows of passages each having more than three passages per row and typically the pattern of passages includes a large number of passages on the order of 49 to 64 passages. Preferably each passage has a square or rectangular cross-section or the like as shown so that each passage is separated from adjacent passages in the body by thin webs 20 of resistor material of equal and generally uniform thickness.

In accordance with this invention, the inner walls of each resistor passage are covered with an adherent, electrically conductive coating 22 by which ohmic or other suitable contact is made to the resistor material. The coatings or contact elements in alternate body passages are then electrically connected together at one end of the resistor body while the coatings formed on the walls of the other body passages are electrically connected together, preferably at the opposite end of the resistor body. Preferably for example, as shown in FIG. 1, the coatings of ohmic contact material 22 in alternate body passages are electrically connected together by a pattern 24 of electrically conductive material coated on the end surface 16 of the resistor body, the pattern having portions 24.1 extending between the ends of pairs of said other body passages to interconnect the ends of the coatings formed in the alternate body passages. A corresponding pattern 26 of electrically conductive material is coated on the opposite end surface 18 of the resistor body (see FIG. 2) for electrically interconnecting the coatings 22 of ohmic contact material in the other body passages. The material used in forming the ohmic contact coatings 22 can also be used in forming the interconnection patterns 24 but the interconnection pattern material need not be in ohmic contact with the resistor material. For clarity of illustration, the interconnection patterns 24 and 26 are shown to extend completely around ends of the coatings 22 to which the respective patterns are connected but it will be understood that the patterns need connect to the coatings in the passages at only a single location.

Figure 3:
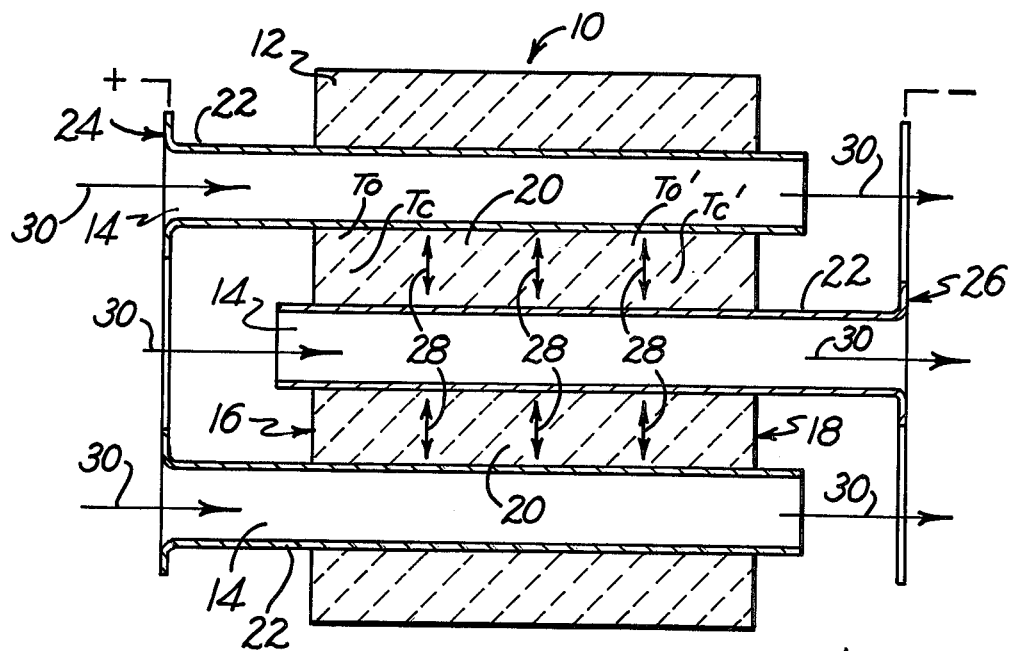
FIG. 3 is a schematic view illustrating operation of the resistor device of FIG. 1.

In this arrangement, the interconnection patterns 24 and 26 serve as terminals of the resistor device 10. Accordingly, when the terminals are connected to a power source such as is schematically illustrated in FIG. 3, current flows through the thin webs 20 of the resistor body between the ohmic contact coatings 22 connected to the pattern 24 and the ohmic contact coatings 22 connected to the pattern 26 as indicated by the arrows 28 in FIG. 3. Where the webs 20 of the resistor body are very thin, the room temperature resistance of the resistor body 10 is very low even though conventional ceramic PTC materials having conventional room temperature resistivities are used in the resistor body. On the other hand, where the interconnection patterns 24 and 26 are each connected to a plurality of ohmic contact coatings 22, the effective ohmic contact area of each device terminal is relatively large. Accordingly, current density in the webs 20 of the resistor body is very low even though the resistor device is adapted to carry a substantial current load.

In addition, because the webs 20 of the resistor body are typically very thin, temperature gradients which may occur across the thickness of the webs are not significant. That is, although the center portion of a web 20 may have a temperature $T_c$ as indicated in FIG. 3 while the outer surface portion of the web has a lower temperature indicated at $T_o$ in FIG. 3, the thin nature of the web keeps this gradient from being significant. On the other hand, if a fluid to be heated is directed through the device passages as indicated by the arrows 30 in FIG. 3 so that the device temperatures $T_c'$ and $T_o'$ are relatively higher than the temperatures $T_c$ and $T_o$, the higher resistivities of the resistor material where the temperatures $T_c'$ and $T_o'$ occur do not in any way restrict current flow between ohmic contact areas at other locations within the resistor body. Accordingly, the occurrence of the noted temperature gradient along the length of the device does not result in any of the resistor material being subjected to an excessively high, local, electrical field.

For example, where the resistor device 10 is to be used as a bistable current limiting device requiring a low room temperature resistance less than about 0.3 ohms but where a conventional ceramic resistor material having a room-temperature resistivity of about 36 ohm-centimeters is used in the resistor body 12, the ratio of ohmic contact area provided by each of the device terminals 24 and 26 to the thickness of the resistor material through which current is directed has to be greater than about 120 centimeters. Accordingly, the device 10 is typically formed of a conventional lanthanum-doped titanate material having an empirical formula of $Ba_{.968} Pb_{.030} La_{.002} Ti O_3$. Such a resistor material has a room temperature resistivity of about 36 ohm-centimeters and a Curie temperature of about 140° C and would display a sharp, anomalous increase in resistivity to about $10^5$ ohm-centimeters when the resistor material is heated above its anomaly temperature to 200° C. The resistor body is provided in the form of a square prism 0.6 centimeters on a side by 2.0 cm long having 16 passages of a square cross-section 0.1 centimeters on a side arranged in 4 rows of 4 passages each with webs 20 between the passages having a thickness of about 0.04 centimeters. The inner walls of the passages 14 are then coated with molecular bonding aluminum ink, with an electroless nickel plating, or with another electrically conductive coating material 22 conventionally used in forming ohmic contacts on such ceramic resistor materials. The electrically conductive interconnection patterns 24 and 26 are then applied to opposite end faces of the resistor body to form device terminals as above described.

In this arrangement, the effective ohmic contact surface area of each of the device terminals is about 4.8 square centimeters providing a ratio A/L of ohmic contact area (A) to web thickness (L) of about 120 centimeters. Thus, the resistor device is provided with a room-temperature resistance of 0.3 ohms and is adapted to carry a normal current load of 1.0 ampere in a 12 volt system with a current density of only about 200 milliamperes per square centimeter in the webs 20 of the resistor body. The structure of the resistor device permits the device to easily dissipate the heat generated in the device to an air ambient at 25° C while carrying that current load without increasing resistor temperature more than about 12° C. However, if resistor current is abruptly increased to above 3.0 amperes, the resistor device is rapidly heated to its anomaly temperature for increasing device resistance to 50 ohms for typically restricting resistor current to 0.2 amperes.

Figure 4:
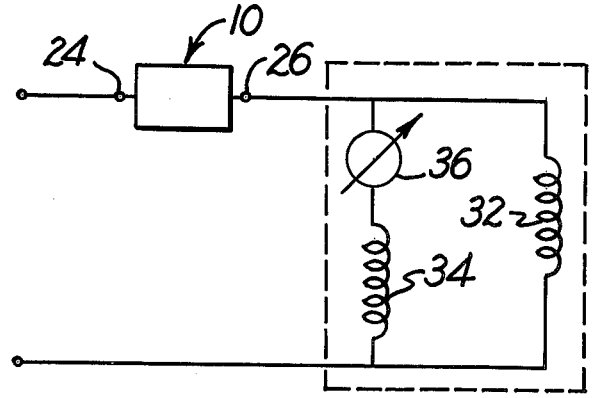
FIG. 4 is a schematic view illustrating application of the resistor device of FIG. 1 to a solid state motor protection system.

Accordingly, the resistor device 10 is adapted for use as a bistable current limiting device to provide solid state protection for an electrical motor to prevent overheating of the motor windings as is schematically illustrated in FIG. 4. That is, where a conventional electrical motor having a main winding 32 and a start winding 34 are connected as shown in FIG. 4 using a conventional motor starting resistor 36 of a PTC material for effectively cutting out the start winding 34 after motor starting has occurred, the terminals 24 and 26 of the resistor device 10 are connected as shown for interposing the resistor device 10 in series between the motor and a power source indicated by the line terminals 36. Where the resistor device 10 is provided with characteristics as above described to match the operating characteristics of the selected motor, the resistor device is adapted to carry the normal operating current of the motor including the initially higher currents occurring as normal variations in motor operation take place but is adapted to rapidly heat to the anomaly temperature of the resistor materials in the device 10 on the occurrence of a locked rotor condition or the like in the motor for restricting motor current to a safe level to prevent excessive overheating of the motor winding 32. For example, the resistor device 10 exemplified above is adapted for use with an electrical motor having normal operating currents varying between 1.0 and 2.0 amperes but is adapted to restrict motor current to 0.2 amperes within 20 seconds after the occurrence of a motor overload current of 5.0 amperes.

Figure 6:
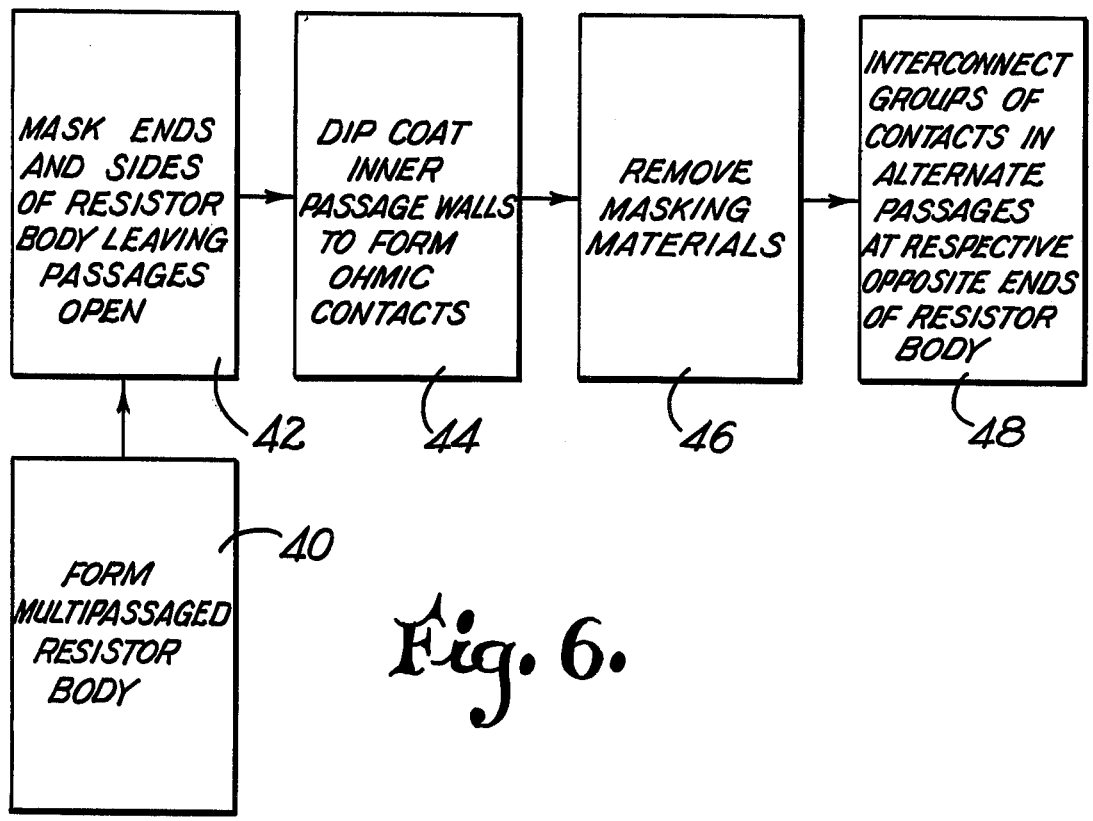
FIG. 6 is a block diagram illustrating steps in manufacture of the resistor device of FIG. 1.

The resistor device 10 is manufactured in a variety of ways in accordance with this invention, but basically includes the process steps illustrated in FIG. 6. In this regard, the formation of the multi-passaged body 12 indicated at 40 in FIG. 6 is accomplished in the manner illustrated in U.S. Pat. No. 3,790,654, for example, or in other well known ways as may be preferred. The outer side and end surfaces of the resistor body are then covered with a masking material in any conventional way, as by dip or brush coating or the like, while leaving the ends of the body passages open as indicated at 42 in FIG. 6. The inner walls of the body passages are then coated with the ohmic contact materials 22 in any conventional way as by dipping the masked resistor body in a suitable coating bath such as a bath of molten metal, or electroless nickel plating baths or the like as indicated at 44 in FIG. 6. The marking materials are then removed as indicated at 46 in FIG. 6. Preferably the coating deposited on the passage walls are subjected to a heat treatment for facilitating making of ohmic contact to the resistor materials. As various methods for coating ceramic resistor materials with ohmic contact materials are well known, the process for coating the inner passage walls is not further described but it will be understood that any conventional techniques are used.

Figure 5:
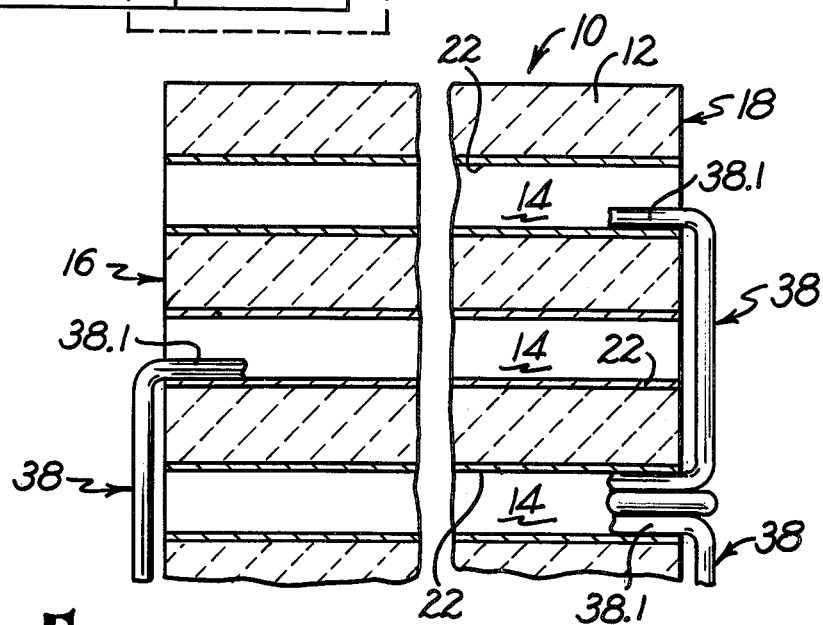
FIG. 5 is a section view similar to FIG. 2 illustrating alternate embodiment of this invention particularly adapted for use in a current limiting application.

After formation of the coatings 22, the coatings 22 are interconnected in a variety of ways within the scope of this invention as indicated at 48 in FIG. 6. For example, as shown in FIG. 5, conductive members are pressed into the ends of appropriate passages 14 to engage the ohmic contacts 22 inside the passages. The conductive members comprise jumpers 38, for example, having ends 38.1 which are proportioned to occupy less then the full cross-section of the passages but are held therein by engagement of the opposite end of the jumper in another passage. Alternately, a plug (not shown) is provided with a plurality of plug rods slidably fitted into respective passage ends for interconnecting the ohmic contacts within the passages. These interconnection systems are useful where the resistor body passages are relatively large and where the resistor device is to be used in an application not involving flow of a fluid through the body passages.

Figure 7:
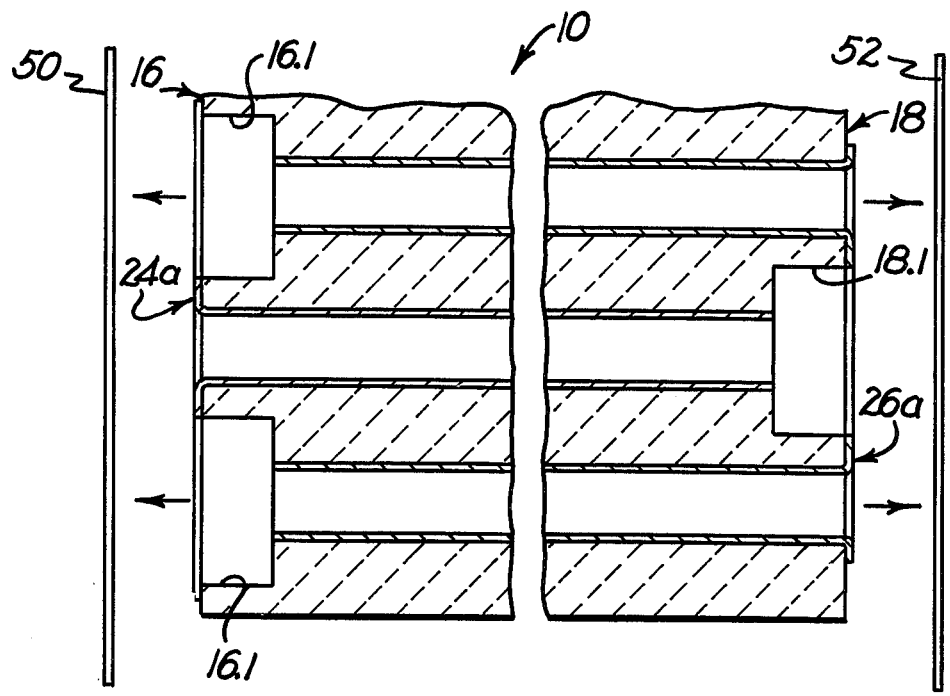
FIG. 7 is a section view similar to FIG. 2 illustrating a step in an alternate process for making the resistor device of this invention.

Alternately, the interconnection patterns 24 and 26 are formed on the end surfaces 16 and 18 of the resistor body by brushing or by transfer of the pattern from a transfer tape carrier for the interconnection pattern. For example, in one embodiment of this invention, the resistor device is processed as indicated at 40, 42, 44, 46 in FIG. 6. The ends of alternate body passages are then counterbored on the body end surface 16 as indicated at 16.1 in FIG. 7. Corresponding counterbores 18.1 are then formed at the opposite ends of the other body passages as indicated in FIG. 7. Then, transfer tapes 50 and 52 carrying interconnection pattern materials as indicated at 24 *a* and 26 *a* in FIG. 7 are pressed against the opposite ends of the resistor body to transfer the coating materials thereto, the tape carriers 50 and 52 then being withdrawn as indicated by the arrows in FIG. 7 to leave the coatings on the resistor end faces interconnecting appropriate groups of ohmic contacts 22.

It should be understood that although various embodiments of the resistor devices, methods and application systems of this invention have been described by way of illustrating the invention, this invention includes all modifications and equivalents of the disclosed embodiments falling within the scope of the appended claims.

I claim:

1. A resistor device comprising a body of resistor material of positive temperature coefficient of resistivity having a plurality of passages extending through the body between ends of the body in spaced, side-by-side relation to each other in a selected pattern defining a plurality of webs of said resistor material between said passages, electrically conductive coatings on the inner walls of said passages in ohmic contact relation to the body of resistor material, first electrically conductive interconnection coating means on an end of the body electrically connecting the coatings in selected alternate ones of said passages together, and second electrically conductive interconnection coating means on an end of the body electrically connecting the coatings in others of said passages together, whereby, when said interconnection means are electrically connected to respective terminals of an electrical power source, electrical current is directed through said webs of resistor material between the coatings in said alternate body passages and adjacent coatings in said other body passages.

2. A resistor device as set forth in claim 1 wherein said resistor material displays a sharp, anamalous increase in resistivity when heated to a selected temperature, whereby the temperature of said resistor device is self-regulated when said interconnection means are connected to respective power source terminals.

3. A resistor device as set forth in claim 2 wherein said passages are rectilinear in cross-section and are equally spaced from adjacent passages extending through said body.

4. A resistor device as set forth in claim 3 wherein said resistor body is formed of a ceramic titanate material.

5. A resistor device as set forth in claim 4 wherein said resistor body is formed of a ceramic titanate material having an empirical formula of $Ba_{.968} Pb_{.030} La_{.002} Ti O_3$.

6. A resistor device as set forth in claim 1 wherein said passages extend between opposite end surface of said resistor body, said first interconnection coating means being adhered to one of said body end surfaces having portions electrically connected to coatings in said alternate passages and extending between ends of said other passages, and said second interconnection coating means being adhered to the other of said body end surfaces having portions connected to coatings in said other passages and extending between ends of said alternate passages.

7. A resistor device as set forth in claim 6 having counterbores in said other passage ends at said one body end surface spacing the coatings in said other passages from said first interconnection means and having counterbores in said alternate passage ends at said other body end surface spacing the coatings in said alternate passages from said second interconnection means.

8. A resistor device comprising a body of resistor material of positive temperature coefficient of resistivity having a plurality of passages extending through the body between ends of the body in spaced, side-by-side relation to each other in a selected pattern defining a plurality of webs of said resistor material between said passages, electrically conductive coatings on the inner walls of said passages in ohmic contact relation to the body of resistor material, first electrically conductive interconnection means having portions slidably fitted into alternate ones of said passages at an end of the body to electrically engage the coatins within said alternate passages for electrically connecting the coatings in said alternate passages together, and second electrically conductive interconnection means having portions slidably fitted into the others of said passages at an end of the body to electrically engage the coatings within said other passages together, whereby, when said interconnection means are electrically connected to respective terminals of an electrical power source, electrical current is directed through said webs of resistor material between the coatings in said alternate body passages and adjacent coatings in said other body passages.

9. A resistor device as set forth in claim 8 wherein said first interconnection means has said portions slidably fitted into said alternate passages at one end of the resistor body and said second interconnection means has said portions slidably fitted into said other passages at the opposite end of said resistor body.

* * * * *